United States Patent [19]

Chen et al.

[11] Patent Number: 5,080,836

[45] Date of Patent: Jan. 14, 1992

[54] TOWER PACKING WITH SMALL AND LARGE LOUVERS

[75] Inventors: Gilbert K. Chen, Farmers Branch; Robert McKelvy, Dallas; Jorge A. Bonilla, Dallas; Don Glaspie, Dallas, all of Tex.

[73] Assignee: Glitsch, Inc., Dallas, Tex.

[21] Appl. No.: 618,725

[22] Filed: Nov. 27, 1990

[51] Int. Cl.[5] .............................................. B01F 3/04
[52] U.S. Cl. .................................................. 261/112.2
[58] Field of Search .................................... 261/112.2

[56] References Cited

U.S. PATENT DOCUMENTS

| | | | |
|---|---|---|---|
| 2,582,826 | 1/1952 | Glitsch | 189/34 |
| 2,611,596 | 9/1952 | Glitsch | 261/114 |
| 3,008,553 | 11/1961 | Glitsch et al. | 189/36 |
| 3,013,782 | 12/1961 | Glitsch | 261/114 |
| 3,079,134 | 2/1963 | Winn | 261/113 |
| 3,080,155 | 3/1963 | Glitsch et al. | 261/114 |
| 3,087,711 | 4/1963 | Glitsch | 261/114 |
| 3,233,708 | 2/1966 | Glitsch | 189/36 |
| 3,343,821 | 9/1967 | Winn et al. | 261/112 |
| 3,652,066 | 3/1972 | Faigle | 261/112.2 |
| 3,785,620 | 1/1974 | Huber | 259/4 |
| 3,830,684 | 8/1974 | Hamon | 261/112.2 |
| 3,959,419 | 5/1976 | Kitterman | 261/98 |
| 3,969,447 | 7/1976 | Glitsch et al. | 261/111 |
| 4,123,008 | 10/1978 | McClain | 239/568 |
| 4,128,684 | 12/1978 | Bomio et al. | 428/175 |
| 4,139,584 | 2/1979 | Holmberg | 261/112 |
| 4,198,002 | 4/1980 | McClain | 239/568 |
| 4,296,050 | 10/1981 | Meier | 261/112 |
| 4,597,916 | 7/1986 | Chen | 261/94 |
| 4,604,247 | 8/1986 | Chen et al. | 261/94 |
| 4,643,853 | 2/1987 | Braun | 261/112 |
| 4,676,934 | 6/1987 | Seah | 261/112.2 |
| 4,729,857 | 3/1988 | Lee et al. | 261/97 |
| 4,842,778 | 6/1989 | Chen et al. | 261/97 |
| 4,909,967 | 3/1990 | Binkley et al. | 261/97 |
| 4,950,430 | 8/1990 | Chen et al. | 261/112.2 |
| 4,956,127 | 9/1990 | Binkley et al. | 261/114.1 |

FOREIGN PATENT DOCUMENTS

| | | | |
|---|---|---|---|
| 294635 | 2/1971 | U.S.S.R. | 261/112.2 |
| 1004046 | 9/1965 | United Kingdom . | |
| 1341981 | 12/1973 | United Kingdom | 261/112.2 |

OTHER PUBLICATIONS

G. Chen, "Packed Column Internals," *Chemical Engineering*, Mar. 5, 1984.

Rombopak eine geordnete Packing fur Rektifikation und Absorption Product Brochure.

Kuhni AG Plants and Equipment for the Chemical Industry Product Brochure.

Raschig Ralu-Pak 250 YC Product Brochure.

*Primary Examiner*—Tim Miles
*Attorney, Agent, or Firm*—Johnson & Gibbs

[57] ABSTRACT

Method of and apparatus for vapor-liquid contact utilizing louvered structured packing. The packing is provided in corrugated sheets and between the fold lines of the corrugations, a plurality of large louvered openings are disposed in generally parallel spaced relationship. An array of small louvers is disposed between the large louvers. Each of the louvers is oriented for selectively vectoring the flow of liquid and/or vapor around and through the corrugated sheets when disposed within a process tower.

20 Claims, 4 Drawing Sheets

TOWER PACKING WITH SMALL AND LARGE LOUVERS

BACKGROUND OF THE INVENTION

1. Field of the Invention

The present invention relates to structured packing for vapor-liquid process towers and, more particularly, to a packing made up of corrugated, louvered contact plates disposed in face-to-face contact for use in such process towers.

2. History of the Prior Art

In the vapor-liquid contact art, it is highly desirable to utilize methods and apparatus that efficiently improve the quantity of the mass and/or heat transfer occurring in process towers. The technology of such process towers is replete with various packing designs used for tower packing. The types of packing employed are functions of the particular process to be effected within the tower. The packing elements may thus comprise a structured array (structured packing) arranged to form a regular array inside the column or may comprise relatively small shapes such as rings or saddles dumped into and randomly arranged (dump packing) within the tower. Close fractionation and/or separation of the feed stock constituents introduced into the tower and the elimination of harmful or undesirable residual elements imparts criticality to the particular vapor-liquid contact apparatus chosen for a given application. The shape of the dump or structured packing elements determines the flow patterns in and density of the array and the resultant resistance to flow caused thereby. Prior art structured packing arrays have thus found utility in a variety of shapes, sizes and material forms.

It has been found particularly desirable in the prior art to provide apparatus and methods affording efficient heat transfer, fluid vaporization, or vapor condensing whereby cooling of one of the fluids can be accomplished with a minimum pressure drop through a given zone of minimum dimensions. High efficiency, low pressure drop and reduced temperatures are important design criteria in the chemical engineering art such as petroleum fractionation operations. Process towers for effecting such operations ar generally of the character providing descending liquid flow from an upper portion of the tower and ascending vapor flow from a lower portion of the tower. Sufficient surface area for vapor-liquid contact is necessary for the primary function and the reduction or elimination of liquid entrainment present in the ascending vapor. Most often it is necessary for the structured packing array to have sufficient surface area in both its horizontal and vertical planes so that fractions of the heavy constituents are conducted downwardly in condensed form and that vapors are permitted to rise through the packing with minimum resistance. With such apparatus, heavy and light constituents of the feed are recovered at the bottom and top of the tower, respectively, by the interaction of the ascending vapor and descending liquid, mostly upon the surface of the structured packing.

A plurality of stacked layers affording compatible and complemental design configurations are generally assembled within a single process column. Each layer utilizes the velocity and kinetic energy of the ascending vapors to perform the dual function of eliminating liquid entrainment in the ascending vapor and the thorough and turbulent contacting of the vapor with the descending liquid to accomplish sufficient separation or fractionation of the fluids into desired components. Quick cooling of the ascending vapor is generally a prerequisite for efficient operation to effect efficient heat transfer for vapor condensation and minimum pressure drop in a minimum vertical depth of the packing. Oppositely inclined corrugated lamellae, or plates, have thus been utilized in the prior art for affording multiple vapor passages through the horizontal and vertical planes of the packing layers to insure the flow of vapor and distribution thereof within the lamellae and to prevent maldistribution, or channeling, of the vapor through certain portion of the layers and not others. Only in this manner is efficient and effective utilization of the column and the energy applied therein effected.

The structural configuration of inclined corrugated contact plates of the prior art variety often incorporates holes for vapor passage. Vapor turbulence is created by such holes to insure intimate vapor-liquid contact. It is also necessary to insure that the ascending vapor performs a dual function of liquid contact and liquid disentrainment within close proximity to the vertical location at which the ascending vapor approaches or leaves the vapor passage holes. In this manner maldistribution of the ascending vapor or descending liquid is reduced. It is, moreover, a paramount concern of the prior art to provide such methods and apparatus for vapor-liquid contact in a configuration of economical manufacture. Such considerations are necessary for cost effective operation.

Oppositely inclined corrugated plates provide but one method and apparatus for countercurrent, liquid-vapor interaction. With such packing arrays, the liquid introduced at or near the top of the column and withdrawn at the bottom is effectively engaged by vapor being introduced at or near the bottom of the column and withdrawn at the top. The critical feature in such methods and apparatus is to insure that the liquid and vapor achieve the desired degree of contact with each other so that the planned mass or energy transfer occurs at the designed rate. The internal structure is, of course, passive in the sense that it is not power driven externally and has few, if any, moving parts.

The prior art is replete with passive vapor-liquid contact devices utilizing cross-fluted and perforated sheets of material in face-to-face engagement. This configuration encourages the liquid moving through the packing to form itself into films having, in the aggregate, a large area over which the vapor may pass. However, the design problem is not merely a matter of providing a large surface area or a multitude of corrugations, cross-flutes, or perforations. A number of other interrelated design considerations must be taken into account, some of which have been mentioned above.

From a process standpoint, it is important that the desired vapor-liquid contact interaction be carried as close to completion as possible. For example, in a crude oil vacuum tower, efficient fractionation and good separation are needed to produce oil streams that are free of undesirable residual elements. As mentioned above, the contact column and its internal apparatus must efficiently utilize the heat supplied to the unit. In this manner, it minimizes direct operating costs, Whether the objective is mass transfer, heat transfer, liquid-vaporization or vapor condensing duty. With the above, pressure drop is a primary consideration as is the vapor-liquid fluid interface. Structured packing for vapor-liquid contact have been shown in the prior art in such references as U.S. Pat. No. 3,343,821, issued Sept. 26, 1967; U.S. Pat. No. 4,139,584, issued Feb. 13, 1979; U.S. Pat. No. 4,128,684, issued Dec. 5, 1978; U.S. Pat. No. 3,785,620, issued Jan. 15, 1974; and U.S. Pat. No. 3,959,419, issued May 25, 1976.

In the above-referenced vapor-liquid contact method and apparatus patents, several design configurations are presented for affording intimate vapor-liquid contact. In particular, stacked corrugated contact plates in face-to-face contact having corrugations inclined to the horizontal, and/or orthogonal one to the other, have been shown and provided in various material configurations. These configurations include monofilament yarns, and solid plates. It is moreover prominent in the prior art to utilize fluted plates having a plurality of perforations therethrough. One such example is seen in U.S. Pat. No. 4,296,050 issued Oct. 20, 1981, while another is seen in British Patent No. 1,004,046, published Sept. 8, 1965.

While many prior art methods and apparatus for vapor-liquid contact have been shown to be relatively effective, certain disadvantages still remain. In particular, vapor-liquid contact towers incorporating descending liquid flow and ascending vapor flow of the structured packing variety defined above, are generally incapable of readily accommodating internal pressure differentials. Problems also exist with surfaces that face downward, because such surfaces are generally not effectively wetted. Even with slits or lancing of the packing, there are many downward facing surfaces, and few prior art designs effectively address proper wetting or vapor passage therethrough. This is true even with a plurality of apertures disposed in corrugated and/or cross-fluted plates in face-to-face contact such as those referenced above. Vapor flow is ultimately sensitive to pressure differentials, and is easily diverted between the myriad of exposed areas of mating corrugations or flutes.

It is desirable, in countercurrent flow, that both the liquid and the vapor effectively commingle along uniformly wetted packing surfaces. In order for this to occur, it has been shown to be very beneficial for both the liquid and the vapor to be able to pass through the corrugated sheet for effective interaction. Without the free passage of both vapor and liquid through the sandwiched corrugated sheets, zones of either high or low volume flow can occur. These flow volume differentials result in a lack of uniformity and homogeneity within the packing. The most efficient structured packing configuration incorporates a region wherein the ratios of vapor and liquid remain relatively constant with consistent interaction and mixing. This requires a packing surface facilitating uniform flow of both liquid and vapor through both sides of the corrugated sheets, yet in a configuration promoting uniform wetting and spreading of liquid and equalization of pressure between said sheets.

It would be an advantage, therefore, to overcome the problems of the prior art by utilizing the flow directing and gathering features of louvers constructed in the corrugated plates. The methods and apparatus of the present invention provide such an improvement over the prior art packing by providing a corrugated plate having a select louver configuration therein. In this manner, liquid is caused to flow upon and through both sides of the corrugations of facing plates in paths which substantially increase the vapor-liquid contact of ascending vapor and descending liquid normally passing between said corrugated plates. The presence of selectively oriented arrays of louvers in the corrugated sheets permits vapor and liquid flows to be exposed on opposite sides thereof while flowing in opposed directions thereacross. Such liquid vapor flow configurations maximize mass transfer efficiency and may be provided with a minimal increase in production costs over that of conventional opposed plate corrugation assemblies.

SUMMARY OF THE INVENTION

The present invention relates to vapor-liquid contact towers and structured packing arrays disposed therein for affording vapor-liquid contact. More particularly, one aspect of the present invention comprises an improved tower packing of the type comprising a plurality of corrugated sheets in face-to-face contact with opposed corrugations inclined oppositely one to the other. The packing is adapted for receiving a descending liquid flow concomitantly with an ascending vapor flow. This flow pattern enhances vapor-liquid contact. The improvement comprises an array of louvers formed in common flat areas of the corrugated sheets, the louvers being oriented to pass vapor and liquid flow through the flat areas of the sheets.

In another aspect, the invention includes a tower packing for contacting a vapor stream with a liquid stream comprising vertically oriented corrugated sheets in face to face contact. Each of the sheets has fold lines therein establishing ridges and valleys separated by flat areas. The ridges, valleys and flat areas define the corrugated configuration of the sheets. The flat areas are provided with a plurality of laterally extending louvers and substantially all of the louvers terminate adjacent but short of the fold lines. The louvers have some upwardly facing edges and some downwardly facing edges. Some of the louvers project transversely outwardly from the respective planes of the flat areas and some of the louvers project transversely inwardly from the respective planes of the flat areas. In one aspect of the invention, some of the louvers are substantially smaller than the others, which small louvers are spaced in select arrays therebetween.

In yet another aspect, the invention described above further includes a tower packing in which at least some openings through the corrugated sheets are defined by an outwardly projecting louver on one side thereof and an inwardly projecting louver on an opposed side thereof. At least some of the louvers may be arranged in laterally aligned pairs and the louvers of the laterally aligned pairs may have their respective edges oriented in the same vertical direction, extending in the same transverse direction from the respective plane of the flat areas.

In a further aspect, the invention includes an improved method of mixing liquid and vapor in a process column of the type described above wherein structured packing is provided in corrugated plates disposed in face to face relationship. The improvement comprises the steps of providing the corrugated plates with a plurality of louvered openings disposed in generally parallel spaced relationship one to the other and forming a first set of large louvered openings in the plates. The large louvered openings are disposed in parallel spaced relationship across the flat areas of the corrugated plates, and an array of small louvered openings are formed between the large louvered openings. Adjacent ones of the large louvered openings are formed in opposite orientations and the small louvered openings are disposed adjacent thereto. Liquid and vapor are then discharged over the corrugated plates in countercurrent flow which passes through certain ones of the louvers for enhancing the mixing therebetween.

BRIEF DESCRIPTION OF THE DRAWINGS

For a more complete understanding of the present invention and for further objects and advantages thereof, reference may now be had to the following description taken in conjunction with the accompanying drawing in which.

DETAILED DESCRIPTION

Figure 1:
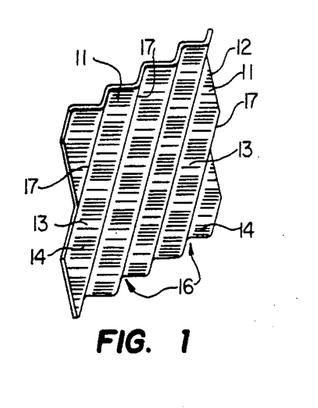
FIG. 1 is a perspective view of a corrugated plate adapted for vapor-liquid contact and having small and large louvers formed therein in accordance with the principles of the present invention.

Referring first to FIG. 1, there is shown a perspective view of a vapor-liquid contact plate 12 constructed in accordance with the principles of the present invention for use in a process tower to be described below. The plate 12 comprises a relatively thin corrugated sheet formed from stainless steel, or the like, and having a series of large and small louvers formed therethrough. Thin corrugated sheets of this general type are conventionally used for vapor-liquid contact plates. Large louvers 13 are spaced between series of smaller louvers 14, forming defined louver patterns across the plate 12. Each louver 13 and 14 is formed in the generally flat, or planar side wall 11 of the corrugation and, as described below, said louvers extend to, but not through the corrugation valleys or ridges. Vapor and liquid are then induced to flow in opposite directions along such louver regions and through the plate 12 for effecting mass and heat transfer, as discussed in more detail below. The manner in which the vapor and liquid flow is directed upon, through and between respective plates 12 directly affects the efficiency of the tower operation and forms the subject of the present invention.

Still referring to FIG. 1, the plate 12 comprises a crimped or corrugated member having a plurality of flow channels 16 defined between adjacent side walls 11 and within the respective corrugation ridges 17 disposed thereacross. Each corrugation ridge 17 defines a trough on the opposite side thereof, which "trough" may also be referred to by the number 17. The corrugated plates 12 are adapted for positioning in face-to-face relationship, wherein the louvers 13 and 14 induce the passage of liquid and vapor through the plate 12. The flow of liquid and vapor through the plates 12 minimizes maldistribution of the fluid constituents within the structured packing of the tower under various operating conditions that will be discussed below.

Figure 2:
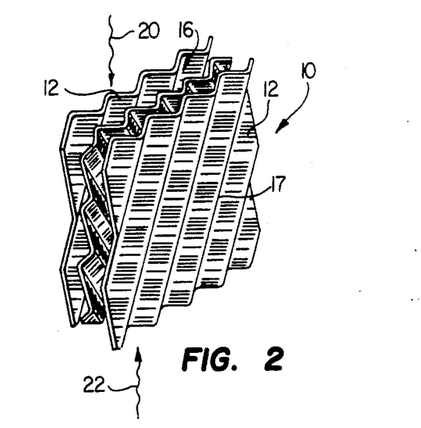
FIG. 2 is a perspective view of a plurality of the corrugated plates of FIG. 1 in an assembled configuration.

Referring now to FIG. 2, there is shown a perspective view of a partial assembly of structured packing 10 of plates 12. The structured packing assembly 10 as shown herein comprises only a portion of a structured packing layer for use in a process tower. A large number of plates 12 would ordinarily be used to define a single layer, any part of which would appear similar to that shown in FIG. 2. In the assembled configuration, the plates 12 are disposed in face to face relationship with their corrugation angles oppositely disposed. A plurality of discrete flow channels 16 are formed within the packing 10 as defined by the contiguous plates 12. The respective flow channels 16 defined between the corrugation ridges 17 of each plate 12 are best seen in the top plan view of FIG. 3.

Still referring to FIG. 2, it may be seen that liquid descending through the packing assembly 10 will engage vapor ascending through said packing resulting in interaction therebetween. Liquid descending along each plate 12 is optimally spread across both sides of the corrugation channel 16 and will also pass through the louvered surfaces thereof. Vapor rising between plates 12 may likewise pass along and through the respective plates by virtue of the louvers 13 and 14 therein. The orientation of the louvers 13 and 14, as described in more detail below, will affect the volume and flow pattern of vapor deflected therethrough.

Figures 3, 4:
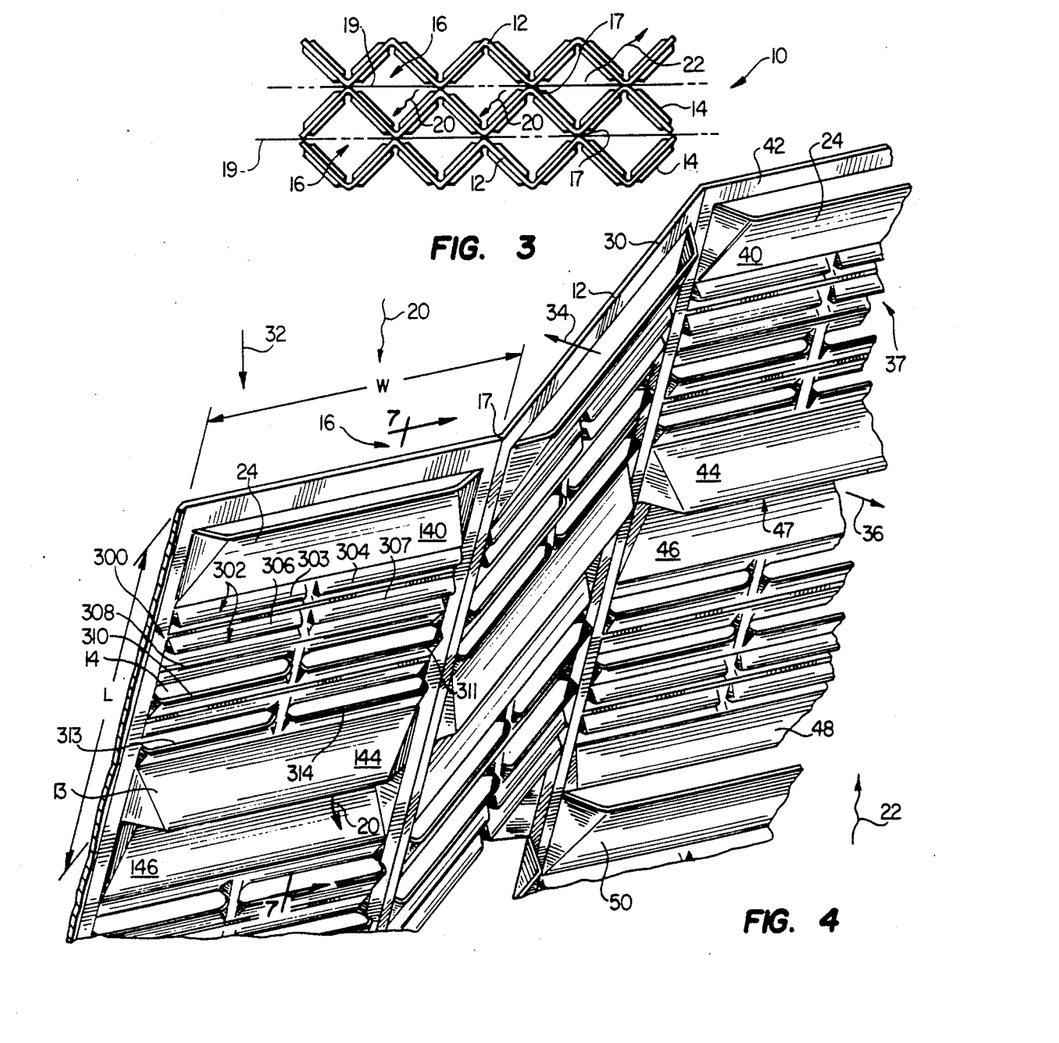
FIG. 3 is an enlarged top plan view of the assembled vapor-liquid contact plates of FIG. 2.
FIG. 4 is an enlarged, fragmentary, perspective view of the corrugated plate of FIG. 1 illustrating the small and large louvers formed therein.

Referring now to FIG. 3, there is shown a top plan view of the assembly 10 of FIG. 2 wherein the plates 12 are assembled in face-to-face relationship. In this abutting engagement, a notional plane 19 is defined between the contiguous ridges 17 of adjacent plates 12. In this manner, ridges 17 of adjacent plates 12 contact each other along the notional plane 19, which is represented in phantom in the present illustration. In some prior art structured packing, a lamella discretely separates the adjacent corrugated plates 12 by being placed in the notional plane 19. This physical separation across the notional plane affords defined fluid flow as set forth and described in U.S. Pat. No. 4,597,916, assigned to the assignee of the present invention and incorporated herein by reference. In the present construction, no lamella is provided along the notional plane which separates the plates 12 one from the other. Such a plate is not considered necessary because of the enhanced vapor and liquid flow along and through the plates 12 as provided by the louvered configuration herein described.

Referring now to FIGS. 2 and 3 in combination, liquid 20 descending through the packing 10 flows upon and between the adjacent plates 12 as vapor 22 ascends upwardly therethrough. The louvers in surface 11 will vector the flow of both vapor and liquid through the plate 12 for uniform interaction therebetween. As shown most clearly in FIG. 3, the ascending vapor 22 will rise upwardly through the channels 16 defined between the plates 12. Concomitantly, the liquid 20 will descend generally along both sides of the plates while engaging the ascending vapor 22 rising therein. The presence of louvers 13 and 14 will directly affect both the descending liquid 20 and ascending vapor 22 by forcing said constituents into direct contact one with the other and by forcing said constituents to pass through the respective plates 12 in which the louvers 13 and 14 are formed.

Referring now to FIG. 4, an enlarged, fragmentary, perspective view of a section of the plate 12 of FIG. 1 is shown. The plate 12 includes corrugation ridges 17 defining flow passages 16 (seen most clearly in FIG. 2) therebetween. The plate 12 further includes a plurality of louvers 13 and 14 defining a series of directional flow openings therethrough. Large louvers 13 are formed in a preset pattern relative to the smaller louvers 14. The orientation of the respective louvers is comprised of a number of parameters and the discussion of said parameters requires a series of terms for purposes of discussion therewith. The following terms are utilized herein for purposes of discussing the louver configuration as shown in FIG. 4 and subsequent drawings. Each flat area 11 has a corrugation width "W" that is equal to the distance between adjacent folds, or ridges of the corrugation. For references purposes, a length "L", taken at a right angle from "W" along the flat area which is equal to the corrugation width "W" will be used to define a unit area (L×W) that is herein referred to as a "square corrugation unit". For example, a corrugation width W of 0.75 inches would mean that a length L down the corrugation flat area of 0.75 inches would define a "square corrugation unit". In this example, the square corrugation unit area is 0.5625 square inches. The reference to "square corrugation unit" will be used herein for purposes of defining the number of louvers from a density standpoint.

Additional terms used herein may be based upon the bottom and top of plate 12 of FIG. 4. The top edge 30 will be considered the uppermost reference surface and the direction of arrow 32 will be considered downwardly therefrom. Arrow 34 represents the direction through the plate 12 which will be termed "inward" or "inwardly" hereinafter; while arrow 36 represents the direction through the plate "outwardly" thereof; and number 37 will thus represent the "outward" surface. Each louver is formed adjacent to an oppositely disposed "companion" louver which also extends from the opposite surface of the plate 12 to define an enlarged opening, or space therebetween and through the plate 12. Also each louver is formed with a "juxtaposed" louver adjacent thereto and extending from a common land area of plate 12. Each juxtaposed louver pair comprises oppositely oriented louvers which may project from the same or opposite surfaces of the plate 12 as discussed in FIG. 7.

Utilizing the parameters above discussed and still referring to FIG. 4, uppermost louver 40 of surface 37 of flat plate section 42 faces upwardly and outwardly. Large louver 44 disposed therebeneath faces outwardly and downwardly. Between large louvers 40 and 44 a series of smaller louvers 14 are formed in pairs. Beneath large louver 44 is another large louver 46 which faces upwardly and inwardly to form a large opening through the plate 12 indicated by arrow 47. Because of this particular view, the inward direction of louver 46 is not as clearly shown as it will be in FIG. 7. Beneath louver 46 is large louver 48 which faces downwardly and inwardly. Below louver 48 and adjacent thereto, large louver 50 faces outwardly and upwardly. The pattern of the smaller louvers will be discussed in conjunction with FIG. 7 below. A discussion of "comparison" and "juxtaposed" louvers for a pattern of small louvers 13 is set forth in U.S. patent application Ser. No. 618,724, filed on even date herewith, by the same inventors, assigned to the assignee of the present invention and incorporated herein by reference for all intent and purposes.

The construction of the large louvers 13 within the plate 12 provides a myriad of advantages to fluid flow therealong. Liquid 20 descending downwardly upon the plate 12 will engage the large louver 24 facing upwardly causing the deflection through the plate 12. If said liquid does not then migrate through plate 12 via the smaller louvers 14 disposed therebelow, it will eventually engage a large lower louver 46 for engagement therewith, causing said liquid to pass downwardly and therethrough. This flow is illustrated very diagrammatically in FIG. 8. A myriad of flow configurations and patterns will exist along plate 12 depending on the fluid flow characteristics tower operating conditions.

Still referring to FIG. 4, the ascending vapor 22 will likewise find itself sequentially engaged by downwardly extending louvers such as louver 44 which will capture and redirect portions of ascending vapor flow therethrough. The ascending vapor flow passing upwardly through louver 44 will directly engage descending liquid flow captured by upper louver 40 enhancing the vapor-liquid contact therebetween. Not only is the liquid directly forced into engagement with the vapor, but the vapor is permitted to vent through the plate 12 for proper pressure and flow equalization.

Figure 5:
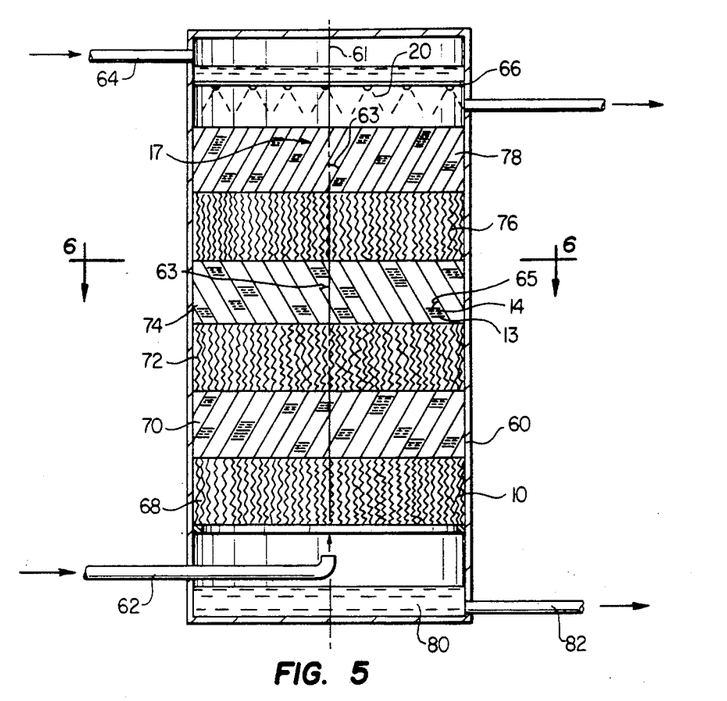
FIG. 5 is a side elevational, cross sectional view of a process tower having stacked therein a plurality of layers of the assembled plates illustrated in FIG. 2 and incorporating one embodiment of the method and apparatus of the present invention.

Referring now to FIG. 5, there is diagrammatically shown a process tower 60 stacked with layers of structured packing 10 constructed in accordance with the principles of the present invention. The tower 60 includes a lower vapor feed line 62 and an upper liquid feed line 64. Liquid and vapor discharge lines are shown. Liquid 20 is dispersed across a distributor 66 for passage downwardly through the structured packing disposed therebeneath. The tower 60 further includes a central axis 61, shown in phantom. It may be seen that the corrugation ridges 17 form an angle 63 relative to the tower axis 61. Angle 63 is the acute angle which the ridge 17 forms. It may also be seen that the louvers 14 of this particular embodiment are formed orthogonally to the tower axis 61 and form an acute angle 65 relative to the corrugation ridge 17. In accordance with this embodiment of the present invention, the sum of angles 63 and 65 is approximately 90°.

Still referring to FIG. 5, a lower level 68 of structure packing is disposed immediately above the vapor supply line 62. Above layer 68 is a second layer of packing 70 which is rotated relative to layer 68. The angular notation is typical in the placement of structured packing beds in process columns and may be in the range of 45° to 90°, and a variety of angles could be used. Layer 72 is thus disposed at an angle to layer 70 with layer 74 rotated relative thereto. Upper layer 76 is disposed beneath top layer 78 which is disposed beneath the liquid discharge distributor 66. Liquid 20 is shown discharged from distributor 66, which liquid collects in lower reservoir 80 at the bottom of the column 60 where it is discharged through discharge pipe 82. In this typical diagrammatic illustration of structured tower packing, it may be seen that the liquid flows in direct counter-current flow relative to the vapor for interaction and mass transfer therewith.

Figure 6:
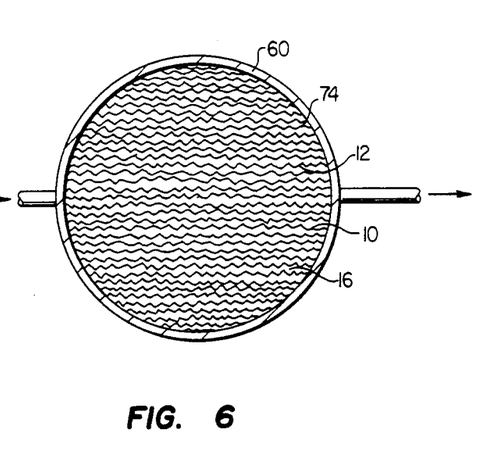
FIG. 6 is a top plan, cross sectional view of the process tower of FIG. 5 taken along lines 6—6 thereof.

Referring now to FIG. 6, there is shown a top plan view of the structured packing layer 74 of FIG. 5 taken along lines 6—6 thereof. The packing 74 is diagrammatically shown to comprise a series of corrugated plates 12 aligned in a generally parallel spaced relationship in the manner discussed above. It may be seen that the array of plates 12 form an intricate section of flow channels 16 therebetween. The uniform countercurrent flow of liquid and vapor therein can prevent a number of problems from occurring and the present invention addresses such considerations.

Figure 7:
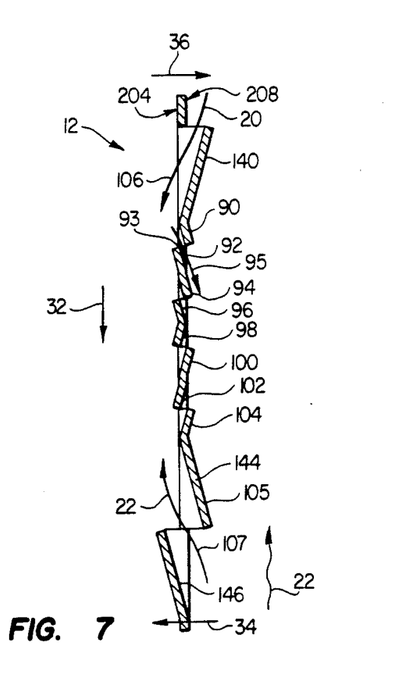
FIG. 7 is an enlarged side elevational cross sectional view of the corrugated plate of FIG. 4 taken along lines 7—7 thereof.

Referring now to FIG. 7, there is shown an enlarged, side elevational, cross-sectional view of a section of the plate 12 of FIG. 4 illustrating the louvered configuration thereof. A series of large louvers have been sequentially numbered to generally correspond to the previous numbering of the louvers in FIG. 4. The louvers 13 and 14 are seen to extend from inside plate surface 204 and outside plate surface 208, from which directional references will be taken. Louver 140 is thus seen as the counterpart of louver 40, above discussed, while louver 144 is the counterpart of louver 44 above discussed. Louvers 140, 144 and 146 are likewise shown in FIG. 4 as well as discussed herein. Louver 140 is oriented upwardly and outwardly to receive the flow of liquid 20 therein. The flow of liquid 20 is shown in the direction of arrow 106, which flow is downwardly and inwardly in the direction of arrow 32. Immediately beneath large louver 140 is a small louver 90 facing downwardly and outwardly and contiguous adjacent small louver 92 facing upwardly and inwardly. The aperture 93 defined as that opening between oppositely oriented louvers 90 and 92 (one facing inwardly, one facing outwardly) will form a larger space than any single small louver 14 could form by itself relative to the plate 12. Louver 92 thus faces upwardly to define aperture 93, which aperture engages descending liquid flow 106 for vectoring said liquid flow outwardly therethrough in the direction of arrow 95. It has been demonstrated that upwardly deflecting louvers of both the large and the small variety engage and directly deflect the downward flow of liquid 20 therethrough, forcing said liquid to pass through the plate 12.

Still referring to FIG. 7, beneath louver 92 is disposed small, "juxtaposed" louver 94, which louver extends from a common land area with louver 92 and is angled downwardly and outwardly. Below louver 94 is small, "comparison" louver 96, which louver faces inwardly and upwardly to form the enlarged opening therebetween. Louver 98 disposed therebelow faces downwardly and inwardly and comprises the "juxtaposed" louver to louver 96. Louver 100 faces upwardly and outwardly and is formed adjacent lower louver 102 which faces downwardly and inwardly. Finally, louver 104 faces outwardly and upwardly and is disposed immediately above large louver 144. Any liquid passing downwardly over the outward surface of the louver 100 could be engaged by the upward opening of louver 104 and deflected therethrough. Liquid which is not deflected through louver 104 will pass downwardly across the upper and outer surface 105 of louver 144. Ascending vapor 22 would likewise find a passage between large louvers 144 and 146 as shown by arrow 107. This flow of vapor is not only through plate 12 but countercurrent to, and intimately against, liquid flowing downwardly along both surfaces thereof. Such intimate flow communication further enhances the mass transfer therebetween.

Referring now to FIGS. 4 and 7 in combination, the present invention provides a series of large and small louvers which impart an advantageous flow characteristic to the counter-current interaction of vapor and liquid. The small louvers 14 are capable of a vectoring thin sheets of liquid therethrough while permitting a continual flow of both liquid and vapor thereover. The larger louvers 13 are capable of deflecting much larger amounts of liquid and vapor therethrough and/or venting large accumulations of either for purposes of flow equalization on opposite sides of plate 12.

Figure 8:
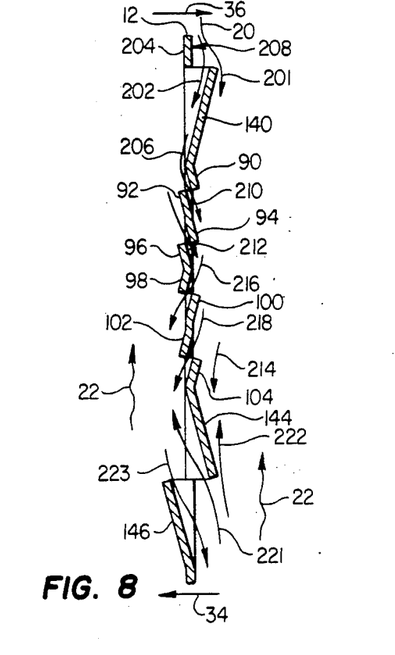
FIG. 8 is an enlarged side elevational cross sectional view of the corrugated plate of FIG. 4 taken along lines 7—7 thereof and illustrating the flow of fluids therethrough.

Referring now to FIG. 8, there is shown the same view of the plate section of FIG. 7 illustrating, in more detail, one pattern of passage of vapor and liquid therethrough. Each of the various louvers are not separately numbered in this view for purposes of facilitating a discussion of the fluid flow pattern therein. Descending liquid 20 is thus shown to form a split stream 201 and 202 as it encounters first large louver 140 projecting from side 208. The stream 202 is vectored downwardly and inwardly by louver 140 causing it to pass to the inside surface 204 of plate 12. Along the inside surface 204, the liquid 202 is permitted to continue downwardly in the direction of flow arrow 206. In this pattern, it may continue downwardly or flow through small louver 90 to the outside surface 208 of plate 12 as indicated by flow arrow 210. The volume of fluid 206 vectored through the small louvers such as louver 90, will depend on a number of parameters including the liquid, flow rate, the louver size, and the configuration of ascending vapor flow 22. It may be seen that the size of the opening for the small louver 90 is relatively small, and the maximum volume of liquid that can pass therethrough is substantially less than that afforded by the large opening of louver 140. Once the maximum flow rate is achieved, additional liquid will simply flow over the louver.

Still referring to FIG. 8, the liquid flow 206 may continue downwardly along the inside surface 204 to egress through louver 94 a labeled stream 212. A wide variety of flow configurations would, of course, would be possible, and these are presented for purposes of illustration only. The accumulation of fluid flow streams 201, 210 and 212 may likewise continue downwardly along the outside surface 208 in the direction of arrow 214 or a portion thereof may be vectored back through the plate 12 as shown by arrow 216 to emerge under louver 98 as shown herein. In that configuration, the flow 216 will then flow downwardly along plate surface 204. At this point the liquid which began as liquid flow 20 may have passed through the plate as many as three times; having been exposed to ascending vapor flow 22 on both sides of the plate 12. Likewise, some liquid may not pass through louver 98 and may continue as liquid stream 218 which passes through lower louver 104 as shown herein. The designation of the louver through which the flow passes clearly depends on the point of reference of the observer. Liquid stream 218 actually passes between louvers 102 and 104 because the space therebetween is formed as a result of said louvers in combination. References to flow through a single louver are to be viewed as a reference to flow through that louver and the adjacent louver forming the flow aperture therebetween.

Referring still to FIG. 8, the descending liquid flow 20 meets the ascending vapor flow 22 along the plate 12. The ascending vapor flow is most easily vectored through the plate 12 by the large louvers 140 and 144 a shown herein. The large louvers are sized to present a sufficient surface area for engaging and vectoring the vapor flow through the plate 12, which size is substantially larger than the aperture region of a small louver such as louver 90. In this manner, there should not be a volume of liquid passing through the large louver 144 which would block and/or inhibit the ascending flow of vapor therethrough. Arrow 221 thus indicates the passage of vapor 22 through the plate 12 as arrow 222 indicates the passage of vapor around louver 144 and along plate 12. Arrow 221 is shown oppositely disposed arrow 223, indicating the counter-current flow of liquid along the inside surface 204 of plate 12, which liquid is deflected outwardly and downwardly through large louver 146. It may be seen that a greater quantity of liquid can be carried through the large louver 146 than the small louver 96. For this reason, the orientation of the louvers is formed complementary to one another and the constituent flow therethrough. For example, as seen in FIGS. 4 and 8 in combination, the large louvers 140 will engage and divert a substantial volume of liquid 20 passing downwardly along plate 12. Unless the liquid flow is very large, only a small portion of liquid will be diverted over louver 140 in the direction of arrow 201. For this reason, lower louvers 90 and 94 are outwardly and downwardly deflected louvers, which present exposed louvered surfaces of upwardly and inwardly deflected louvers 92 and 96 to the liquid flow 202 on side 204. This pattern is presented in comparison to a hypothetical louver configuration of an upwardly/outwardly deflected set of louvers Which could be disposed immediately below large louver 140. Such a hypothetical louver configuration would not complement the large louver configuration due to the particular constituent flows therethrough. Similarly, large louver 144 which is downwardly and outwardly deflected is disposed beneath upper louvers 104 and 100 which are upwardly and outwardly deflected. Vapor that will be deflected through the plate 12 is deflected by louver 144 and thus louvers 100 and 104 are not oriented for engaging the vapor flow on outside surface 208 and, instead, are oriented for collecting liquid flow therethrough as shown by flow arrows 216 and 218 of FIG. 8. This complemental louver orientation between small and large louvers maximizes the efficiency of the counter-current vapor liquid flow and the interaction therebetween. Consistent therewith, it may be said that in the present embodiment each large louver 13 is constructed oppositely to the adjacent smaller louvers 14 for maximizing fluid flow through the plate 12. As an example, downwardly and outwardly deflected large louvers are disposed beneath upwardly and outwardly deflected small louvers. There may, of course, be exceptions near the edges of the plates 12.

Referring back to FIG. 4, the louvers 13 and 14 are constructed in a pre-defined density and pattern. Both the density and the patterns may, of course, vary for particular applications. In the present embodiment the pattern 300 incorporates a series of large louvers 140 and 144 between which are disposed small louvers. The pattern has a density on the order of 17 louvers per square corrugation unit (16 small louvers and 1 large louver). The particular pattern 300 includes the 16 smaller louvers 302 (8 louvers projecting outwardly and 8 louvers projecting inwardly) between the large louvers 140 and 144. The small louvers 302 are also of substantially smaller size relative to the large louver 140. Small louvers 302 include, in the present illustration, upper louvers 303 and 304 formed immediately beneath large louver 140. The louvers 303 and 304 are downwardly and outwardly deflected. Louvers 306 and 307 are each formed beneath louvers 303 and 304, respectively, and are likewise formed downwardly and outwardly. An intermediate land area 308 is formed beneath louvers 306 and 307, which land area is of the approximate width of the large louver 140 and of twice the width of smaller louvers 303, 304, 306 and 307. It may be seen that the small louvers 303 and 304 are constructed to present a combined width substantially equivalent to the width of the large louver adjacent thereto. The actual width of the small louvers may vary, but in the present embodiment, for example, each of the small louvers 14 has a width on the order of 45% of the width of the flat area 11; and the height of the small louvers 14 is on the order of 20% of the height of the large louver 13. The laterally aligned pairs of small louvers terminate adjacent to, but short of the fold lines 17. The smaller, segmented, construction is preferable for structural purposes in view of the reduced surface of the louver extending therefrom. It may be seen that the surface area of the louver itself provides a degree of structural rigidity adjacent to the aperture formed between louvers.

Still referring to FIG. 4, louvers 310 and 311 are formed immediately beneath land area 308, which louvers 310 and 311 are upwardly and outwardly deflected. Louvers 313 and 314 are disposed beneath louvers 310 and 311, respectively, and are likewise formed outwardly and upwardly. This constructional aspect may also be seen in the cross-section view of FIG. 7. It may be seen that each of the small and large louvers extend laterally within the flat areas between the ridges and valleys of each corrugated plate 12 and substantially all of the louvers terminate adjacent, but short of, the fold lines. This lateral size aspect of each louver is specifically shown in FIG. 4. Although the terminology of upwardly and downwardly deflected louvers has been used herein, other nomenclature can be used. For example, it may be said that the louvers have faces or edges which face upwardly or downwardly. The louvers may also include some that project transversely outwardly from the respective plane of the flat areas of the plate 12 and some that project transversely inwardly from the respective planes of the flat areas of said plates. The openings between the louvers may also be defined by an outwardly projecting louver on one side of the plate and an inwardly projecting louver on the opposite side of the plate 12.

Figure 9:
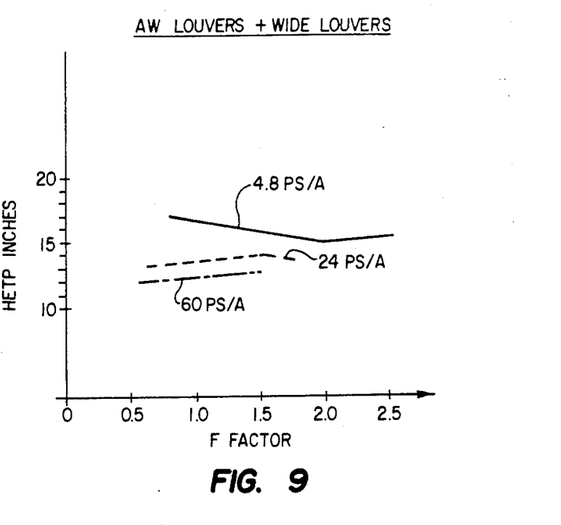
FIG. 9 is a graph charting the performance of the packing of the present invention for various tower pressures.

Referring now to FIGS. 9 through 12, there are shown graphs of the test results indicating performance characteristics of structured packing at various operational conditions. FIG. 9 addresses the performance of structured packing 10 constructed in accordance with the principles of the present invention and assembled in a test column diagrammatically similar to that illustrated in FIG. 5 for measuring the efficiency thereof.

Also in this graph the performance of the structured packing 10 in a cyclohexane/n-heptane system is charted for three tower pressure ranges, to-wit: 4.8 psia, 24 psia and 60 psia. The performance is reflected in HETP inches appearing along the ordinate of the chart. The abscissa of the chart references the "F" factor, which is a common parameter in tower design. The "F" factor is the product of the superficial vapor velocity ($V_s$) across a tower cross section and the square root of vapor density ($D_v$). It may be represented by the following formula: $F = V_s(D_v)^{\frac{1}{2}}$ As indicated by the chart of FIG. 9 the efficiency of the packing increases (a lower HETP) With an increase in pressure from 4.8 psia to 24 psia. This graph indicates that the increase in pressure is so effectively accommodated by the louvered configuration above described that the performance characteristics actually improve.

Figure 10:
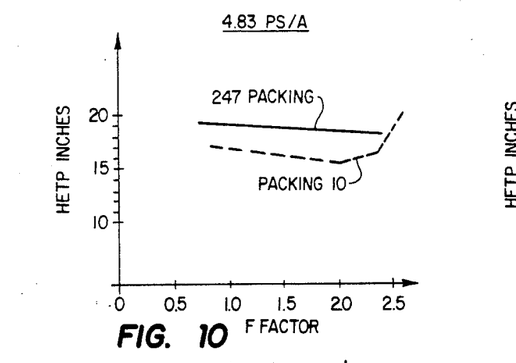
FIG. 10 is a graph charting the performance of the packing of the present invention relative to other structured packing at a selected tower pressure.

Referring now to FIG. 10, there is shown a graph comparing the structured packing 10 of the present invention to another structured packing configuration using the same system referred to above. The structured packing of comparison is that set forth and shown in U.S. Pat. No. 4,604,247 (hereinafter referred to as the "'247 packing"). The relative performances of these packings are again charted with HETP appearing along the ordinate and the F-factor along the abscissa. As seen in FIG. 10, the packing 10 of the present invention has a improved performance in comparison to the '247 structured packing. This performance curve is generated at a relatively low tower pressure of 4.83 psia.

Figure 11:
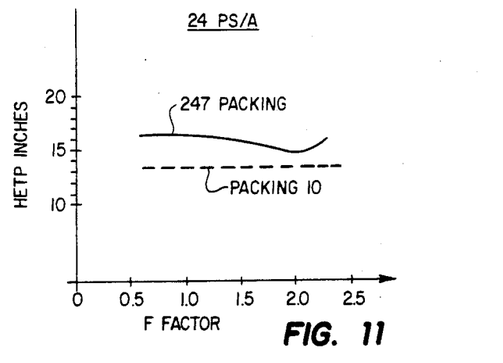
FIG. 11 is a graph charting the performance of the packing of the present invention relative to other structured packing at a second tower pressure.

Referring now to FIG. 11, there is shown the same chart as FIG. 10 and the comparison of the same structured packing and system therein. In this illustration, the above referenced packings are measured at a tower pressure of 24 psia. The tower packing 10 of the present invention has a better performance curve than the '247 packing At this higher pressure the large louvers, particularly adapted for venting vapor through the plate 12, may contribute to the improved performance. It is thought that the size of the large louvers as well as their constructional configuration improves the vapor passage and homogeneity of vapor flow.

Figure 12:
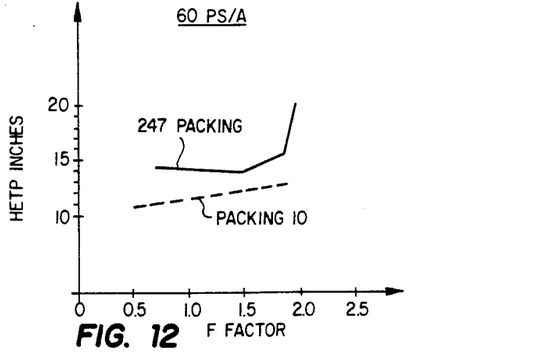
FIG. 12 is a graph charting the performance of the structured packing of the present invention relative to other structured packing at a third tower pressure.

Referring now to FIG. 12, there is shown the charted performances of the above referenced packing at a tower pressure of 60 psia. The packing 10 of the present invention again performs better than the '247 packing. Again, the increased efficiency is thought to be attributable in part to the large louvers which facilitate the equalization of vapor pressure and the homogeneity of vapor flow around the plates 12 in the structure configuration shown herein.

Figure 13:
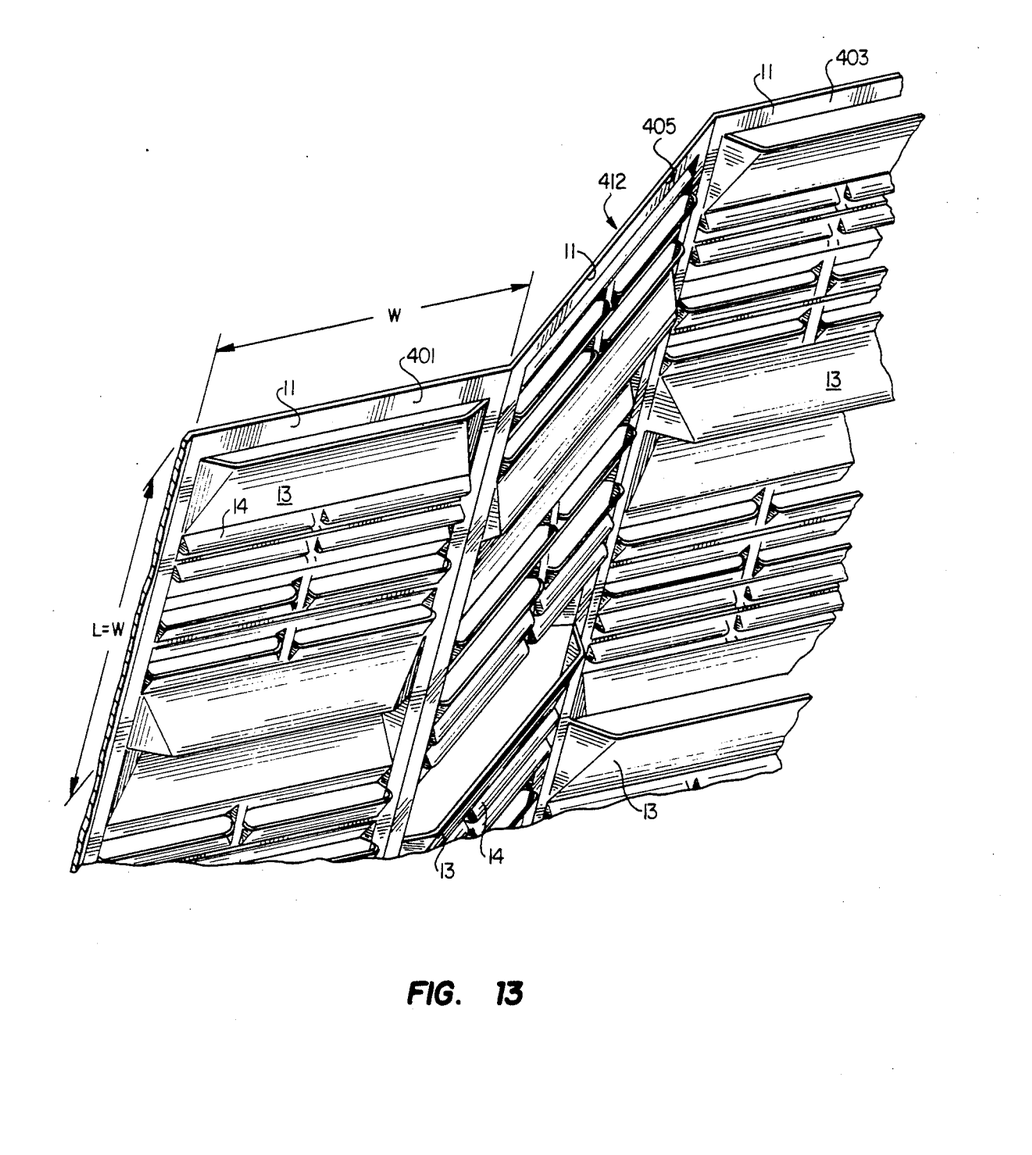
FIG. 13 is a perspective view of an alternative embodiment of the corrugated plate of FIG. 4.

Referring now to FIG. 13, there is shown a perspective view of an alternative embodiment of the corrugated plate 12 of FIG. 4. Plate 412 includes a plurality of louvers 13 and 14 defining a series of directional flow openings therethrough. The large louvers 13 are, however, vertically staggered between corrugation flat areas 11 so that no two, adjacent large louvers 13 are laterally aligned one with the other. Corrugation flat areas 401 and 403 are thus shown with louvers 13 and 14 in lateral alignment one with the other. Intermediate corrugation flat area 405 is constructed with louvers 13 and 14 vertically offset from the lateral louver alignment between sections 401 and 403, whereby large louvers 13 are disposed approximately midway between the large louvers 13 of adjacent sections. It has been shown that this staggering of louver positions provides a structurally stronger plate 412, particularly when it is being coined from a flat metal sheet to form louvers 13 and 14 in the fabrication stage. Because of the aforesaid structural considerations, it is presently thought that this configuration may provide certain structural advantages, although operationally this embodiment is thought to perform in substantially the same manner as the other embodiments discussed herein.

In operation, the flow of liquid downwardly across the plate 12 is effectively improved relative to many prior art plate design. Unlike smooth plates, the liquid is not given a chance to accumulate in the troughs 17 (as seen most clearly in FIG. 4) due to the spacing of the louvers. As seen in the drawings, the edges of the louvers are disposed along the borders of the trough, whereby any fluid accumulation therein is effectively diverted by the presence of the louver. As described above, in one embodiment, the louvers are thus constructed with pairs of small louvers of an oppositely oriented configuration disposed adjacent each large louver. The defined pattern, as shown herein, incorporates first and second pairs of small louvers between each pair of large louvers. Likewise, each pair of small louvers includes segmented louver regions. Due to the size of the small louvers, they are formed in segments relative to the large louver wherein the length of each small louver is approximately one half length of each large louver. This construction provides the structural rigidity necessary for the tower packing. Also, each small louver is oppositely oriented with regard to the large louver adjacent thereto. An upwardly, inwardly directed large louver is thus disposed above a pair of upwardly outwardly disposed small louvers which are themselves each provided in pairs beneath the large louver. This pattern of eight small louvers disposed between each set of large louvers is but one embodiment of the present invention. The small louvers may be constructed in varying arrays. The construction shown herein does however lend itself to symmetry in fabrication, which symmetry may contribute to the effectiveness of the performance data discussed herein.

It is thus believed that the operation and construction of the present invention will be apparent from the foregoing description. While the method and apparatus shown and described has been characterized as being preferred, it will be obvious that various changes and modifications may be made therein without departing from the spirit and scope of the invention as defined in the following claims.

We claim:

1. A tower packing for contacting a vapor stream with a liquid stream comprising a plurality of vertically oriented corrugated sheets in face to face contact with opposed corrugations inclined oppositely to one another, each of said sheets having fold lines therein establishing ridges and valleys separated by flat areas, said ridges, valleys and flat areas defining said corrugated configuration of said sheets, said flat areas being provided with a plurality of laterally extending louvers thereon, substantially all of said louvers terminating adjacent but short of said fold lines, some of said louvers being of a first kind extending substantially from a point adjacent one fold line to a point adjacent the next fold line, and the balance of said louvers being of a second kind extending for a distance less than the lateral distance between fold lines.

2. A tower packing in accordance with claim 1 in which said louvers of the first kind include some having upwardly facing edges and some having downwardly facing edges.

3. A tower packing in accordance with claim 1 in which said louvers of the second kind include some having upwardly facing edges and some having downwardly facing edges.

4. A tower packing in accordance with claim 1 in which said louvers of the second kind include some projecting transversely outwardly from the respective planes of said flats and some projecting transversely inwardly from the respective planes of said flat areas.

5. A tower packing in accordance with claim 1 in which at least some of said louvers of the second kind are arranged in laterally aligned pairs.

6. A tower packing in accordance with claim 5 in which the louvers of said laterally aligned pairs have their respective edges oriented in the same vertical direction, and extend in the same transverse direction from the respective plane of said flat areas.

7. A tower packing in accordance with claim 1 in which said louvers of the first kind include some projecting transversely outwardly from the respective planes of said flat areas and some projecting transversely inwardly from the respective planes of said flat areas.

8. A tower packing in accordance With claim 7 in which at least some openings through said corrugated sheets are defined by an outwardly projecting louver of the first kind on one side thereof and an inwardly projecting louver of the first kind on an opposed side thereof.

9. A tower packing in accordance with claim 7 in which at least some openings through said corrugated sheets are defined by an outwardly projecting louver of the second kind on one side thereof and an inwardly projecting louver of the second kind on an opposed side thereof.

10. An improved method of mixing liquid and vapor in a process column of the type wherein structured packing is provided in corrugated plates disposed in face to face relationship one with the other, said corrugated packing having ridges and valleys with flat areas therebetween and said plates having apertures formed therein for the passage of vapor and liquid thereon and therethrough during the operation of said column, the improvement comprising the steps of:
 providing said corrugated plates with a plurality of louvered openings disposed in generally parallel spaced relationship one to the other;
 forming a first set of large louvered openings in said plates;
 disposing said large louvered openings in parallel spaced relationship across said flat areas of said corrugated plates;
 forming an array of small louvered openings between said large louvered openings and disposing said small louvers in generally parallel spaced relationship across said flat areas of said plate;
 orienting adjacent ones of said large louvered openings in opposite orientations one to the other;
 discharging liquid and vapor over said corrugated plates in countercurrent flow thereover; and
 passing said countercurrently flowing liquid and vapor through certain ones of said louvers for enhancing the mixing therebetween.

11. The method as set forth in claim 10 and further including the step of forming said large louvered openings one above the other and oppositely oriented therefrom.

12. The method as set forth in claim 10 and further including the steps of forming said louvered openings with a first set thereof having upwardly facing edges adapted for engaging descending liquid and with a second set thereof having downwardly facing edges adapted for engaging ascending vapor.

13. The method as set forth in claim 10 and further including the steps of forming said louvered openings with a first set thereof projecting transversely outwardly from the respective plane of said plate and with some projecting transversely inwardly from the first respective plane of said plate.

14. The method as set forth in claim 10 and further including the steps of forming said small louvered openings in pre-defined patterns between said large louvered openings, said pattern including first and second pairs of laterally disposed small louvered openings oppositely oriented from said large louvered openings.

15. The method as set forth in claim 14 and further including the step of disposing said small louvered openings in a lateral width on the order of one-half the width of said large louvered openings.

16. An improved tower packing for contacting a vapor stream with a liquid stream of the type including a plurality of vertically oriented corrugated sheets in face to face contact with opposed corrugations inclined oppositely to one another, each of said sheets having fold lines therein establishing ridges and valleys separated by flat areas, said ridges, valleys and flat areas defining said corrugated configuration of said sheets wherein said improvement comprises:
 said flat areas of said sheets being formed with a plurality of laterally extending louvers thereon, substantially adjacent but short of said fold lines;
 some of said louvers being of a first kind extending substantially from a point adjacent one fold line to a point adjacent the next fold line;
 some of said louvers of the first kind having upwardly facing edges and some having downwardly facing edges;
 some of said louvers of the first kind projecting transversely outwardly from the respective planes of said flats and some projecting transversely inwardly from the respective planes of said flats;
 at least some openings through said corrugated sheets being defined by an outwardly projecting louver of the first kind on one side thereof and an inwardly projecting louver of the first kind on an opposed side thereof;
 some of said louvers being of a second kind extending for a distance less than the lateral distances between fold lines;
 some louvers of the second kind having upwardly facing edges and some having downwardly facing edges;
 some louvers of the second kind projecting transversely outwardly from the respective planes of said flats and some projecting transversely inwardly from the respective planes of said flats; and
 at least some openings through said corrugated sheets being defined by an outwardly projecting louver of the second kind on one side thereof and an inwardly projecting louver of the second kind on an opposed side thereof.

17. A tower packing in accordance with claim 16 in which at least some of, said louvers of the second kind are arranged in laterally aligned pairs.

18. A tower packing in accordance with claim 16 which the louvers of said laterally aligned pairs have their respective edges oriented in the same vertical direction, and extend in the same transverse direction from the respective plane of said flat areas.

19. An improved method of mixing a vapor stream with a liquid stream in a process tower of the type wherein a plurality of vertically oriented corrugated sheets are designed in face to face contact with opposed corrugations inclined oppositely to one another, each of the sheets having fold lines therein establishing ridges and valleys separated by flat areas, the ridges, valleys and flat areas defining the corrugated configuration of the sheets wherein the improvement comprises the steps of:

forming said flat areas with a plurality of laterally extending louvers thereon;

terminating said louvers adjacent but short of said fold lines;

orienting a first set of said louvers to extend substantially from a point adjacent one fold line to a point adjacent the next fold line;

orienting a second set of said louvers to extend for a distance less than the lateral distance between fold lines;

discharging liquid downwardly over said louvers of said sheets;

passing vapor upwardly over said louvers of said sheets; and passing said liquid and said vapor through certain ones of said louvers for enhancing the mixings therebetween.

20. The method as set forth in claim 19 and further including orienting said first set of louvers to cause some to project transversely outwardly from the respective planes of said flat areas and to cause some to project transversely inwardly from the respective planes of said flat areas.

* * * * *

UNITED STATES PATENT AND TRADEMARK OFFICE
CERTIFICATE OF CORRECTION

PATENT NO. : 5,080,836

DATED : Jan. 14, 1992

INVENTOR(S) : Chen, McKelvy, Bonilla & Glaspie

It is certified that error appears in the above-identified patent and that said Letters Patent is hereby corrected as shown below:

Col. 8 Line 14
Delete "patent application"
Insert --Patent Application--

Col. 8 Line 64-65
Delete "notation"
Insert --rotation--

Col. 11 Line 10
Delete "a"
Insert --as--

Col. 11 Line 41
Delete "Which"
Insert --which--

Col. 13 Line 13
Delete "With"
Insert --with--

Col. 13 Line 25
Delete "a"
Insert --an--

Col. 15 Line 26
Delete "With"
Insert --with--

Signed and Sealed this

Sixth Day of April, 1993

*Attest:*

STEPHEN G. KUNIN

*Attesting Officer*    Acting Commissioner of Patents and Trademarks